United States Patent
Donderici

(10) Patent No.: US 12,221,122 B2
(45) Date of Patent: Feb. 11, 2025

(54) SYNTHETIC SCENE GENERATION FOR AUTONOMOUS VEHICLE TESTING

(71) Applicant: GM Cruise Holdings LLC, San Francisco, CA (US)

(72) Inventor: Burkay Donderici, Burlingame, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 324 days.

(21) Appl. No.: 17/968,424

(22) Filed: Oct. 18, 2022

(65) Prior Publication Data

US 2024/0124004 A1    Apr. 18, 2024

(51) Int. Cl.
| | | |
|---|---|---|
| *B60W 50/00* | (2006.01) | |
| *B60W 50/02* | (2012.01) | |
| *B60W 50/06* | (2006.01) | |
| *B60W 60/00* | (2020.01) | |
| *G06F 40/279* | (2020.01) | |
| *G06N 3/084* | (2023.01) | |

(52) U.S. Cl.
CPC ........ *B60W 50/06* (2013.01); *B60W 50/0205* (2013.01); *B60W 60/0015* (2020.02); *G06F 40/279* (2020.01); *G06N 3/084* (2013.01)

(58) Field of Classification Search
CPC ............. B60W 50/06; B60W 50/0205; B60W 60/0015; B60W 50/00; G06F 40/279; G06N 3/084; G06N 3/08; G06N 3/045

USPC .......................................................... 701/23
See application file for complete search history.

(56) References Cited

U.S. PATENT DOCUMENTS

| | | | |
|---|---|---|---|
| 11,170,254 B2* | 11/2021 | Wrenninge | G06F 18/214 |
| 11,610,115 B2* | 3/2023 | Kar | G06N 3/045 |
| 11,694,388 B2* | 7/2023 | Atsmon | G06V 20/56 |
| | | | 382/103 |
| 2022/0402520 A1* | 12/2022 | Hetang | G01C 21/3461 |
| 2023/0229919 A1* | 7/2023 | Kar | G06V 10/764 |
| | | | 706/11 |
| 2023/0306680 A1* | 9/2023 | Atsmon | G06F 18/2148 |

\* cited by examiner

*Primary Examiner* — Shardul D Patel
(74) *Attorney, Agent, or Firm* — Michael DiCato

(57) ABSTRACT

Aspects of the disclosed technology provide solutions for generating synthetic driving scenarios using text-based inputs that describe an intended operating goal. A process of the disclosed technology can include steps for generating a first synthetic scene for testing an autonomous vehicle (AV), providing the first synthetic scene to a first machine-learning model to generate a first text description of the synthetic scene, and providing the first text description to a second machine-learning model to determine if the first text description aligns with the predetermined operating goal for the AV. In some aspects, the process can further include generating a second text description for the synthetic scene, if the first text description does not align with the predetermined operating goal for the AV and providing the second text description to a third machine-learning model to generate a second synthetic scene. Systems and machine-readable media are also provided.

20 Claims, 5 Drawing Sheets

SYNTHETIC SCENE GENERATION FOR AUTONOMOUS VEHICLE TESTING

BACKGROUND

1. Technical Field

The disclosed technology provides solutions for generating synthetic scenarios used for autonomous vehicle (AV) testing and more specifically, for generating synthetic driving scenarios based on text inputs that describe an intended AV operating goal.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide a safe and efficient transportation. Such tasks may require the collection and processing of large quantities of data using various sensor types, including but not limited to cameras and/or Light Detection and Ranging (LiDAR) sensors disposed on the AV. In some instances, the collected data can be used by the AV to perform tasks relating to routing, planning and obstacle avoidance.

BRIEF DESCRIPTION OF THE DRAWINGS

Certain features of the subject technology are set forth in the appended claims. However, the accompanying drawings, which are included to provide further understanding, illustrate disclosed aspects and together with the description explain the principles of the subject technology. In the drawings:

DETAILED DESCRIPTION

Figure 1:
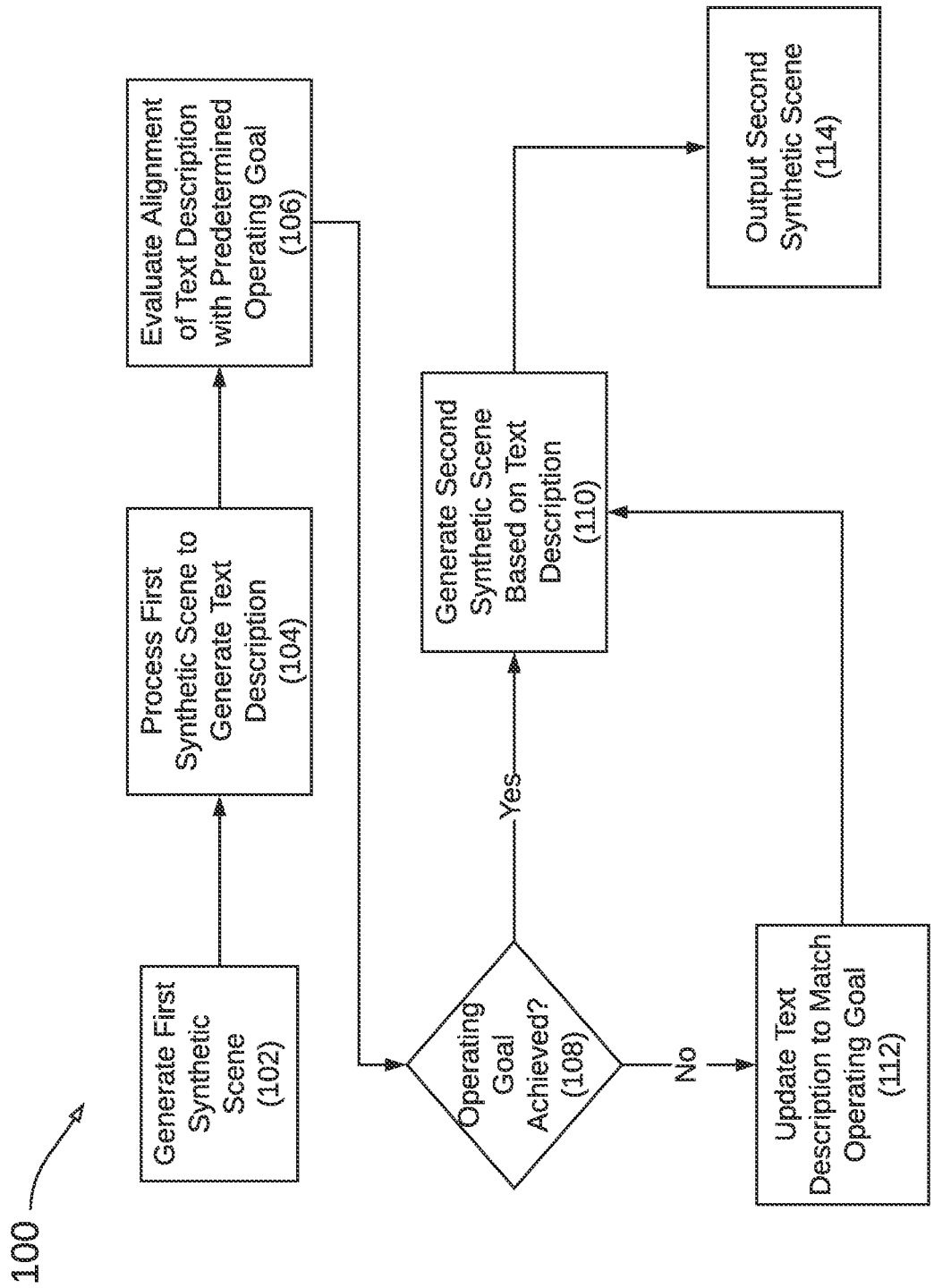
FIG. 1 illustrates a block diagram of an example system that is configured to generate synthetic driving scenes using text-based inputs, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring certain concepts.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Synthetic driving scenes (also: synthetic environments or simulation environments) are commonly used for AV testing and training, especially for corner-case scenarios or safety critical events that are difficult or unsafe to test in real world settings. In addition to realistic visual effects in the simulation, realistic simulation of various real-world driving scenarios is critical. Further, it is essential to have comprehensive testing that covers plausible real-world scenarios so that AV performance can be validated before deployment in real world use cases.

In some approaches, synthetic scenes can be generated using on-road driving data (e.g., bag data), for example, to generate scenarios that resemble real-world driving environments. In other approaches, synthetic scenes may be generated using entirely virtual assets. However, the creation of synthetic scenes and various driving scenarios within the scenes, can be onerous and therefore it can be difficult to generate meaningfully diverse sets of scenarios that are useful for testing myriad operating AV operating goals.

Aspects of the disclosed technology provide solutions for facilitating synthetic scene generation and in particular, for intuitively creating synthetic scenes that can present novel driving scenarios useful for AV testing and training. As discussed in further detail below, aspects of the disclosed technology can be used to generate synthetic scenarios from text descriptions (or text strings) that describe various scenario features or events that are useful for testing and/or validating various AV operating goals. As used herein, operating goals can describe any type of event, maneuver, behavior and/or scenario encountered by the AV while navigating a synthetic scene. For example, operating goals may define various objectives of AV performance, or other constraints under which the AV is to be tested. In some instances, operating goals may specify a time-series of driving maneuvers to be performed by the AV, specific driving events to be encountered by the AV (e.g., approaching a crosswalk, or navigating around an emergency vehicle, etc.) specific types of interactions (e.g., with pedestrians or other vehicles), regulatory requirements under which the AV is to be operated, and the like. In some aspects, the predetermined operating goal may specify rules governing safety violations for a particular area (e.g., speed limits, U-turn rules, etc.). By way of example, operating goals may specify a sequence of maneuvers that are to be performed by the AV and/or a given set of entity interactions that are encountered by the AV. Operating goals may include the existence/inclusion of situations that impact AV safety. For example, operating goals may include the existence of specific inclement weather conditions such as rain, fog, snow, floods, and/or sandstorms, etc. Operating conditions may also define behaviors by various entities or participants in a scene, such as a pedestrian jumping onto the road, a person lying in the road, a vehicle swerving into the path of the vehicle, and/or other events such as parades, and/or crowds traveling to/from a destination, etc. In some instances, operating goals may provide data specifying the occurrence of emergency events such as fires, and/or emergency services personnel tending a patient, etc. Operating goals may also include actors in the scene behaving in accordance to some rules: for example vehicles avoiding parking in certain parts of the road, vehicles parking in certain parts of the road, vehicles following local traffic rules, pedestrians chasing each other, pedestrians dancing, pedestrians running.

FIG. 1 illustrates a block diagram of an example system 100 that is configured to generate synthetic driving scenes using text-based inputs. System 100 includes one or more processes for generating a first synthetic scene (102). The first synthetic scene can represent a three-dimensional (3D) environment that is based on a predetermined operating goal in relation to the AV. Depending on the desired implementation, the first synthetic scene can be generated from data collected by on-road vehicles, such as by using sensor data (e.g., bag data) collected by one or more AVs during normal operation. In such instances, the first synthetic scene can represent a virtual recreation of a real-world driving scene and/or real-world driving scenario/s, e.g., wherein object characteristics represented in the collected sensor data are mapped into corresponding objects (and object characteristics) in the first synthetic scene. In other aspects, the first synthetic driving scene, as well as any scenarios represented therein, may be entirely generated, e.g., without the use of sensor data. In such instances, the placement of 3D assets, such as objects and other entities (e.g., pedestrians, traffic participants, etc.) may be based on virtual representations of real-world objects.

The synthetic scenes may include changes to objects or scene entities that change as a function of time, such as behaviors by an entity (e.g., a vehicle or pedestrian) that change over a given time interval. For example, the first synthetic scene may include a pedestrian running across the road. Due to practical reasons such as minimization of processing and storing costs, time interval can be chosen to be 0 seconds to 60 seconds. In cases where there is a very slow event (such as a heavy construction vehicle moving), the internal can be chosen to be larger (e.g., up to 600 seconds). For scenarios that are related to more sudden events (such as a pedestrian jumping into the road), the time interval can be chosen to be smaller (10-20 seconds). The time intervals are chosen to include all the parts of the event that affect the behavior of the AV.

Irrespective of how the first synthetic scene is generated, the topology of the scene and/or scenarios represented in the scene can be configured based on an intended operating goal for the AV. As discussed above, the operating goal can define some objective of AV performance, or other constraints under which the AV is to be tested. By way of example, the operating goal may specify a series of driving maneuvers to be performed by the AV, specific events to be encountered by the AV, types of interactions (e.g., with other traffic or non-traffic participants), and/or regulatory constraints under which the AV is to be operated, etc. In some aspects, the predetermined operating goal may specify rules governing safety violations for a particular area (e.g., speed limits, U-turn rules, and/or local customs etc.).

Data representing the first synthetic scene can then be processed to generate a first text description representing the first synthetic scene and/or the operating goal that the first synthetic scene describes. For example, the first synthetic scene can be provided to a first machine-learning model to generate a first text description of the first synthetic scene.

The first machine learning model may be (or may include) a Generative Adversarial Network, e.g., that includes at least one generative model, and at least one discriminator model. The first machine-learning model can be configured to generate/output text-based descriptions using synthetic scene input data. As such, the first machine-learning model can be used to produce text-based descriptions of the first synthetic scene, for example, that includes words and/or phrases that describe various features of the inputted scene, including a predetermined operating goal described by the scene. By way of example, if the first synthetic scene includes a driving scenario whereby the AV is required to encounter an erratic or aggressive traffic participant, the first text description may include a textual description of the interaction, e.g., " . . . encounters an aggressive driver."

The level of detail of the textual description can be adjusted based on the compute and explainability requirements. For example, if the available compute power for the GAN is large enough, and explainability is not important, a larger and/or more complicated text output may be provided. For example, outputted text string can be composed of 100 words or more. In other instances, text based outputs may include 1000 words, or 10000 words, etc. If compute and/or power resources available to the GAN are limited, then more parsimonious text strings may be provided. For example, under such conditions only the parts of the scene that are most important and relevant to safety may described or represented by the text. In this case the length of the text description may be smaller (50-100 words). Multiple GAN algorithms can be used to produce differently sized text.

The first text description can then be evaluated to determine an alignment (or fit) between the description and the predetermined operating goal (block 106). By way of example, a second machine-learning model can be used to determine if the (first) text description aligns with the predetermined operating goal. A fit between the first text description and the predetermine operating goal may be provided as a statistical output by the second machine-learning model. For example, on the interval [0, 1], a '1' can represent perfect alignment/agreement between the first text description and the operating goal, and a '0' can represent a complete lack of alignment/agreement between the first text description and the operating goal.

A determination of fit between the first text description and the operating goal can be based on a comparison of the output of the second machine-learning model to a predetermined fit threshold (block 108), for example, that determines an acceptability of the fit/alignment determined at block 106. If it is determined that the first text description adequately matches/fits the operating goal, then the first text description can be used to directly generate a second synthetic scene (block 110). Alternatively, if the first text description does not adequately fit/match the predetermined operating goal, then the text description can be updated to generate a better match (block 112).

In some approaches, generation of the second text description can be aided by a human user. For example, human intervention may be used to modify or update the first text description to produce the second text description that more closely aligns with the predetermined operating goal. In other approaches, a machine learning model may be used to generate the second text description. By way of example, a machine learning model may be trained to generate a text description based on various provided inputs, including but not limited to the first text description and/or other scenario specific information associated with the predetermined operating goal.

The second text description can then be used to generate a second synthetic scene (block 110). For example, by providing the second text description to a third machine-learning model a second synthetic scene can be generated, wherein the second synthetic scene corresponds to the predetermined operating goal. The third machine-learning model can be configured to generate digital images from the natural language description of the second text description. By way of example, the third-machine learning model may be (or may include) a Generative Pre-trained Transformer (GPT) model. The time duration of the second scene may match the time duration of the first scene. Alternatively, the time duration of the second scene may be trimmed to include only the relevant part of the scene that relates to AV safety or comfort.

Generation of the second synthetic scene may be performed in a manner that maximally preserves features from the first synthetic scene. For example, the second synthetic scene may be generated by only making necessary changes scenarios within an environment of the first synthetic scene, e.g., where changes are only made to align the second synthetic scene with the predetermined operating goal. For example, environmental features and other inert objects— such as, roadways, traffic lights, road signs, buildings, and other static objects, etc.—in the first synthetic scene may be retained, whereas dynamic entities that make of the driving scenario may be updated based on the predetermined operating goal.

Figure 2:
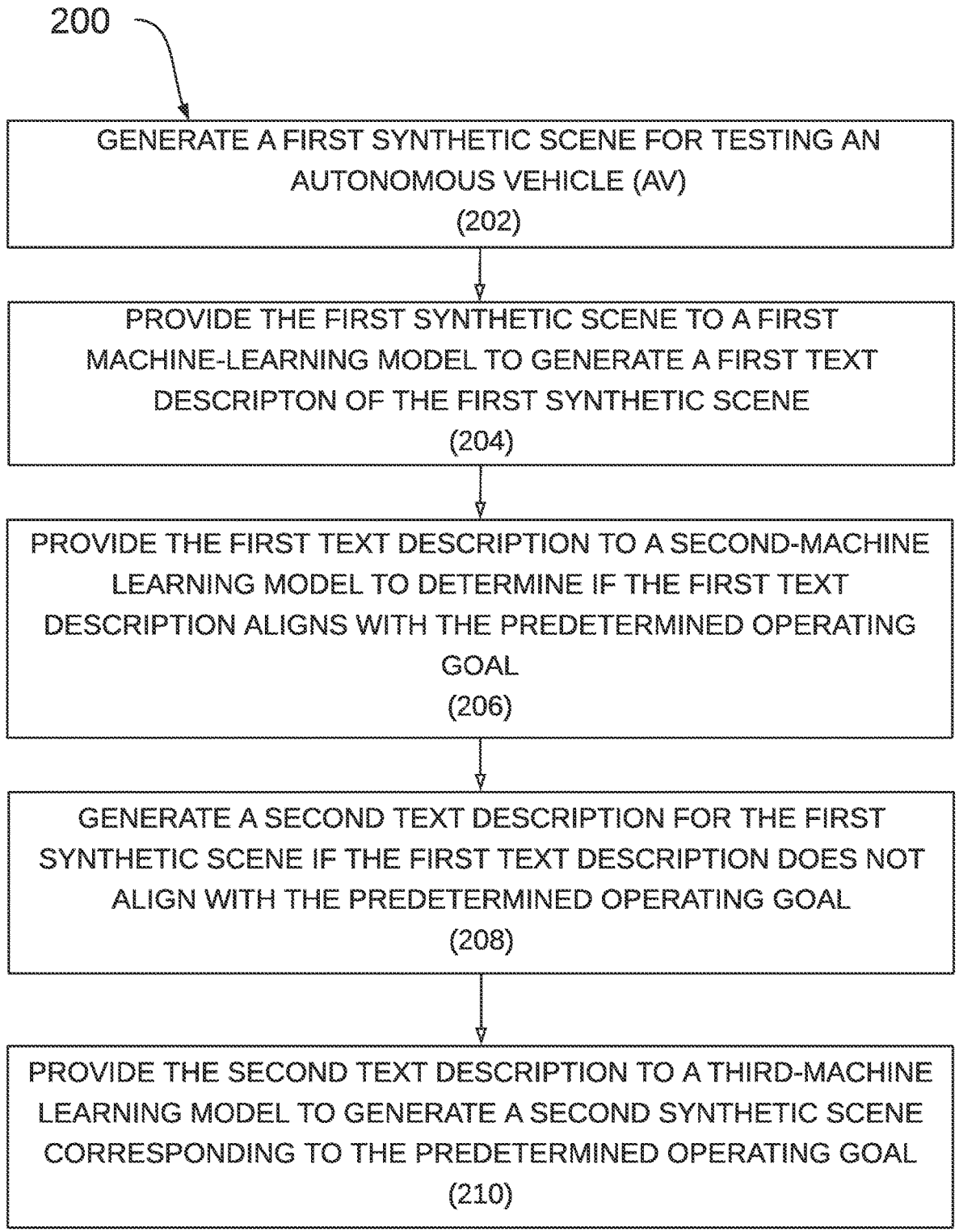
FIG. 2 illustrates steps of an example process for generating a synthetic driving scene, according to some aspects of the disclosed technology.

FIG. 2 illustrates steps of an example process for generating a synthetic driving scene using a text input. At step 202, the process 200 includes generating a first synthetic scene for testing an autonomous vehicle (AV), wherein the first synthetic scene represents a three-dimensional (3D) environment that is based on a predetermined operating goal in relation to the AV. As discussed above, the synthetic scene can be generated from data collected by on-road vehicles, such as by using sensor data (e.g., bag data) collected by one or more AVs during normal operation. In such instances, the synthetic scene can represent a virtual recreation of a real-world driving scene and/or a real-world driving scenario.

The synthetic driving scene, as well as any scenarios represented in the scene, may be entirely generated, e.g., without the use of sensor data. In such instances, the placement of 3D assets, such as objects and other entities (e.g., traffic participants) may be based on virtual recreations of real-world objects. Irrespective of how the first synthetic scene is generated, the topology of the scene and/or the scenarios represented in the scene can be configured based on an intended operating goal for the AV. As discussed above, the operating goal can define some objective of AV performance, or other constraints under which the AV is to be tested. By way of example, the operating goal may specify a time-series of driving maneuvers to be performed by the AV, specific driving events to be encountered by the AV (e.g., approaching a crosswalk or navigating around an emergency vehicle, etc.) specific types of interactions (e.g., with pedestrians or other vehicles), regulatory requirements under which the AV is to be operated, and the like. In some aspects, the predetermined operating goal may specify rules governing safety violations for a particular area (e.g., speed limits, U-turn rules, etc.).

As such, the predetermined operating goal can be determined or defined by the way in which the dynamic driving scenario is played out in the synthetic scene, e.g., by variations in entity behavior with respect to time.

At step 204, the process 200 includes providing the first synthetic scene to a first machine-learning model to generate a first text description of the first synthetic scene. Depending on the desired implementation, the first-machine learning model may be (or may include) a Generative Adversarial Network, e.g., that includes at least one generative model, and at least one discriminator model. The first machine-learning model can be configured to generate/output text-based descriptions using the input data of the first synthetic scene. In this manner, the first machine-learning model can be used to produce written descriptions of the first synthetic scene that include words and/or phrases that codify or describe an intended pre-determined operating goal. By way of example, if the first synthetic scene includes a driving scenario whereby the AV is required to perform a left-turn at a four-way stop, the first text description may include a textual description of this objective, e.g., " . . . includes an unprotected left-turn."

In some instances, the first synthetic scene may not accurately (or adequately) codify the intended predetermined operating goal. As such, at step 206, the process 200 can include providing the first text description to a second machine-learning model to determine if the first text description aligns with the predetermined operating goal. Alignment or agreement between the first text description and the predetermine operating goal may be provided as a statistical output by the second machine-learning model. For example, on the interval [0, 1], a '1' can represent perfect alignment/agreement between the first text description and the operating goal, and a '0' can represent a complete lack of alignment/agreement between the first text description and the operating goal.

At step 208, the process 200 includes generating a second text description for the first synthetic scene, if the first text description does not align with the predetermined operating goal. In some approaches, generation of the second text description can be aided by a human user. For example, human intervention may be used to modify or update the first text description to produce the second text description that more closely aligns with the predetermined operating goal. In other approaches, a machine learning model may be used to generate the second text description. By way of example, a machine learning model may be trained to generate a text description based on various provided inputs, including but not limited to the first text description and/or other scenario specific information that may be associated with the predetermined operating goal.

At step 210, the process 200 includes providing the second text description to a third machine-learning model to generate a second synthetic scene, wherein the second synthetic scene corresponds to the predetermined operating goal for the AV. The third machine-learning model can be configured to generate digital images from the natural language description contained in the second text description. By way of example, the third-machine learning model may be (or may include) a Generative Pre-trained Transformer (GPT) model.

In some aspects, the second synthetic scene may be generated in a manner that maximally preserves features from the first synthetic scene, i.e., where changes are only made to more closely align the second synthetic scene with the predetermined operating goal. For example, environmental features—such as, roadways, traffic lights, road signs, buildings, and other static objects, etc.—in the first synthetic scene may be preserved, whereas one or more dynamic entities that make of the driving scenario may be updated based on the predetermined operating goal.

In some examples, the driving scenario may be updated, e.g., through modifications to one or more entities (e.g., pedestrians, vehicles, or other dynamic characters) based on an objective target safety score for the second synthetic scene. By way of example, a computed safety score for the first synthetic scene may be too low (or too high) based on the predetermined operational goal. In such instances, the second synthetic scene may be generated based on the first synthetic scene, wherein changes made to the second synthetic scene are configured to raise (or lower) the safety score, depending on the desired operational goal. That is, the safety score for the second synthetic scene may be based on (or may be a function of) a safety score computed for the first synthetic scene.

By updating the first text description and enabling the generation of a synthetic scene from the second text description, the disclosed technology facilitates an intuitive process for generating synthetic driving scenes with challenging driving scenarios that can be used for AV development, training and testing.

Figure 3:
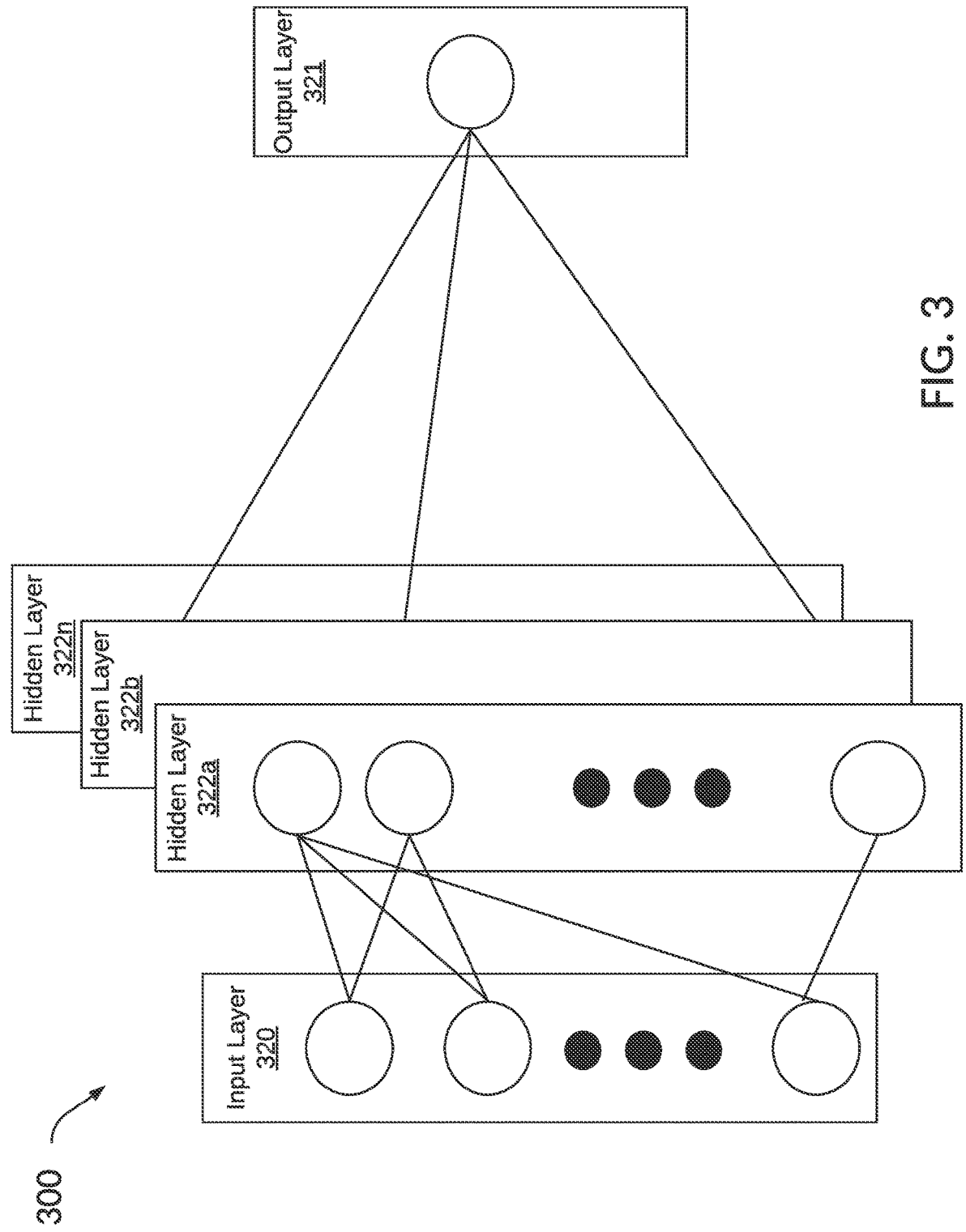
FIG. 3 conceptually illustrates an example of a deep learning neural network that can be used to facilitate a synthetic scene generation process, according to some aspects of the disclosed technology.

FIG. 3 is an illustrative example of a deep learning neural network 300 that can be implemented a synthetic driving scenario process of the disclosed technology. An input layer 320 can be configured to receive input data, such as text strings that can be used to determine a fit/alignment with an AV operating goal. The neural network 300 includes multiple hidden layers 322a, 322b, through 322n. The hidden layers 322a, 322b, through 322n include "n" number of hidden layers, where "n" is an integer greater than or equal to one. The number of hidden layers can be made to include as many layers as needed for the given application. The neural network 300 further includes an output layer 321 that provides an output resulting from the processing performed by the hidden layers 322a, 322b, through 322n.

The neural network 300 is a multi-layer neural network of interconnected nodes. Each node can represent a piece of information. Information associated with the nodes is shared among the different layers and each layer retains information as information is processed. In some cases, the neural network 300 can include a feed-forward network, in which case there are no feedback connections where outputs of the network are fed back into itself. In some cases, the neural network 300 can include a recurrent neural network, which can have loops that allow information to be carried across nodes while reading in input.

Information can be exchanged between nodes through node-to-node interconnections between the various layers. Nodes of the input layer 320 can activate a set of nodes in the first hidden layer 322a. For example, as shown, each of the input nodes of the input layer 320 is connected to each of the nodes of the first hidden layer 322a. The nodes of the first hidden layer 322a can transform the information of each input node by applying activation functions to the input node information. The information derived from the transformation can then be passed to and can activate the nodes of the next hidden layer 322b, which can perform their own designated functions. Example functions include convolutional, up-sampling, data transformation, and/or any other suitable functions. The output of the hidden layer 322b can then activate nodes of the next hidden layer, and so on. The output of the last hidden layer 322n can activate one or more nodes of the output layer 321, at which an output is provided. In some cases, while nodes (e.g., node 326) in the neural network 300 are shown as having multiple output lines, a node can have a single output and all lines shown as being output from a node represent the same output value.

Each node or interconnection between nodes can have a weight that is a set of parameters derived from the training of the neural network 300. Once the neural network 300 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 300 to be adaptive to inputs and able to learn as more and more data is processed.

The neural network 300 is pre-trained to process the features from the data in the input layer 320 using the different hidden layers 322a, 322b, through 322n in order to provide the output through the output layer 321. In some cases, the neural network 300 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training data until the neural network 300 is trained well enough so that the weights of the layers are accurately tuned.

A loss function can be used to analyze error in the output. Any suitable loss function definition can be used, such as a Cross-Entropy loss. Another example of a loss function includes the mean squared error (MSE), defined as $E\_total = \Sigma(\frac{1}{2}(target-output)^2)$. The loss can be set to be equal to the value of E_total. The goal of training is to minimize the amount of loss so that the predicted output is the same as the training label. The neural network 300 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w = w\_i - \eta\, dL/dW$, where w denotes a weight, wi denotes the initial weight, and η denotes a learning rate. The learning rate can be set to any suitable value, with a high learning rate including larger weight updates and a lower value indicating smaller weight updates.

The neural network 300 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 300 can include any other deep network other than a CNN, such as an autoencoder, a deep belief nets (DBNs), a Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; generative adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 4:
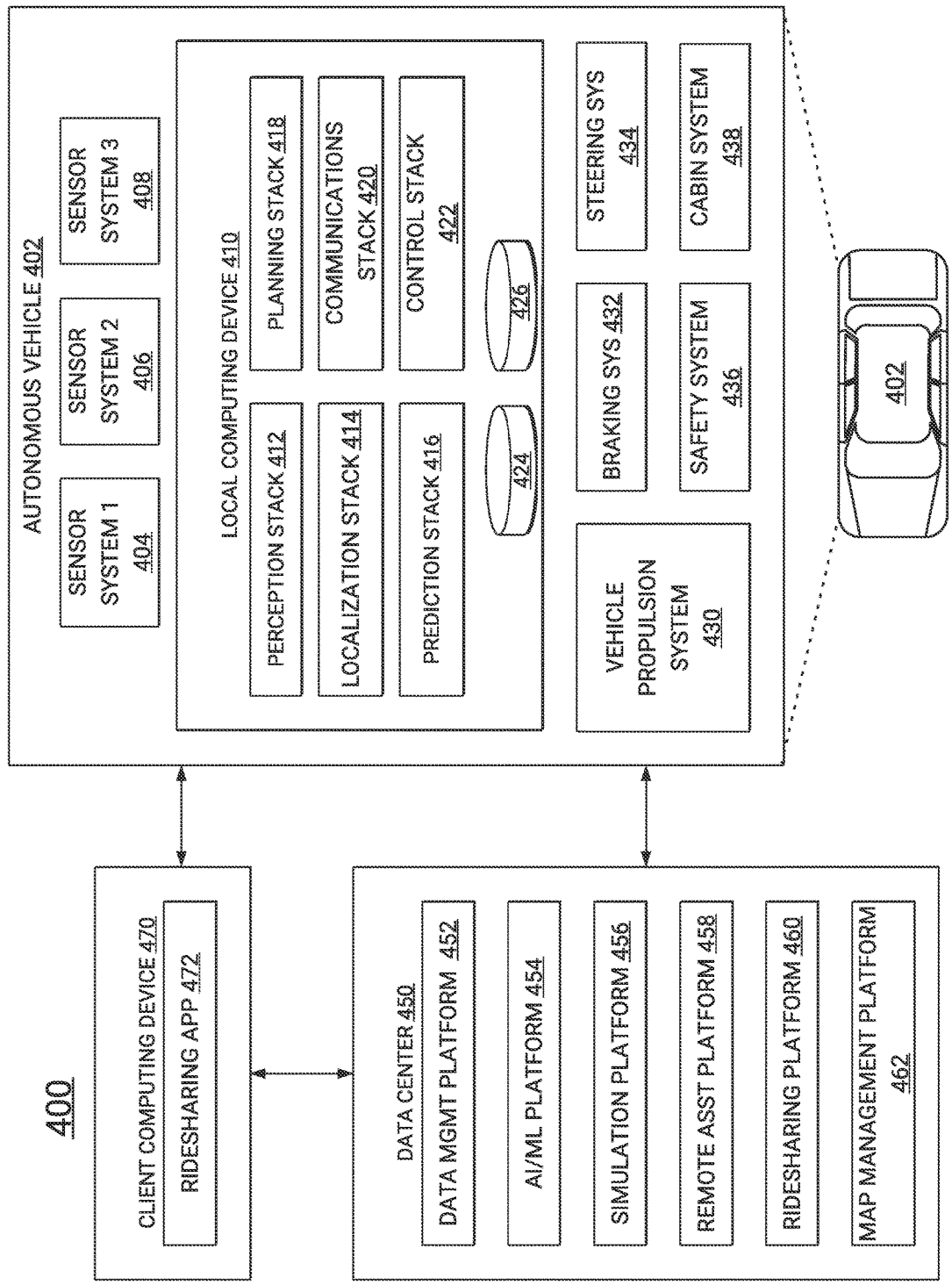
FIG. 4 illustrates an example system environment that can be used to facilitate AV dispatch and operations, according to some aspects of the disclosed technology.

FIG. 4 illustrates an example of an AV management system 400. One of ordinary skill in the art will understand that, for the AV management system 400 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 400 includes an AV 402, a data center 150, and a client computing device 170. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 402 can navigate roadways without a human driver based on sensor signals generated by multiple sensor systems 404, 406, and 408. The sensor systems 404-408 can include different types of sensors and can be arranged about the AV 402. For instance, the sensor systems 404-408 can comprise Inertial Measurement Units (IMUs), cameras (e.g., still image cameras, video cameras, etc.), optical sensors (e.g., LIDAR systems, ambient light sensors, infrared sensors, etc.), RADAR systems, GPS receivers, audio sensors (e.g., microphones, Sound Navigation and Ranging (SO-NAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other embodiments may include any other number and type of sensors.

The AV 402 can also include several mechanical systems that can be used to maneuver or operate the AV 402. For instance, the mechanical systems can include a vehicle propulsion system 430, a braking system 432, a steering system 434, a safety system 436, and a cabin system 438, among other systems. The vehicle propulsion system 430 can include an electric motor, an internal combustion engine, or both. The braking system 432 can include an engine brake, brake pads, actuators, and/or any other suitable componentry configured to assist in decelerating the AV 402. The steering system 434 can include suitable componentry configured to control the direction of movement of the AV 402 during navigation. The safety system 436 can include lights and signal indicators, a parking brake, airbags, and so forth. The cabin system 438 can include cabin temperature control systems, in-cabin entertainment systems, and so forth. In some embodiments, the AV 402 might not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces (e.g., Graphical User Interfaces (GUIs), Voice User Interfaces (VUIs), etc.) for controlling certain aspects of the mechanical systems 430-438.

The AV 402 can additionally include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a mapping and localization stack 414, a prediction stack 416, a planning stack 418, a communications stack 420, a control stack 422, an AV operational database 424, and an HD geospatial database 426, among other stacks and systems.

The perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the mapping and localization stack 414, the HD geospatial database 426, other components of the AV, and other data sources (e.g., the data center 450, the client computing device 470, third party data sources, etc.). The perception stack 412 can detect and classify objects and determine their current locations, speeds, directions, and the like. In addition, the perception stack 412 can determine the free space around the AV 402 (e.g., to maintain a safe distance from other objects, change lanes, park the AV, etc.). The perception stack 412 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Mapping and localization stack 414 can determine the AV's position and orientation (pose) using different methods from multiple systems (e.g., GPS, IMUs, cameras, LIDAR, RADAR, ultrasonic sensors, the HD geospatial database 426, etc.). For example, in some embodiments, AV 402 can compare sensor data captured in real-time by sensor systems 404-408 to data in HD geospatial database 426 to determine its precise (e.g., accurate to the order of a few centimeters or less) position and orientation. AV 402 can focus its search based on sensor data from one or more first sensor systems (e.g., GPS) by matching sensor data from one or more second sensor systems (e.g., LIDAR). If the mapping and localization information from one system is unavailable, AV 402 can use mapping and localization information from a redundant system and/or from remote data sources.

Prediction stack 416 can receive information from localization stack 414 and objects identified by perception stack 412 and predict a future path for the objects. In some embodiments, prediction stack 416 can output several likely paths that an object is predicted to take along with a probability associated with each path. For each predicted path, prediction stack 416 can also output a range of points along the path corresponding to a predicted location of the object along the path at future time intervals along with an expected error value for each of the points that indicates a probabilistic deviation from that point.

Planning stack 418 can determine how to maneuver or operate AV 402 safely and efficiently in its environment. For example, planning stack 418 can receive the location, speed, and direction of AV 402, geospatial data, data regarding objects sharing the road with AV 402 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 402 from one point to another and outputs from the perception stack 412, localization stack 414, and prediction stack 416. Planning stack 418 can determine multiple sets of one or more mechanical operations that AV 402 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 418 can select from multiple backup plans to carry out. For example, while preparing to change lanes to turn right at an intersection, another vehicle may aggressively cut into the destination lane, making the lane change unsafe. The planning stack 418 could have already determined an alternative plan for such an event. Upon its occurrence, it could help direct AV 402 to go around the block instead of blocking a current lane while waiting for an opening to change lanes.

Control stack 422 can manage the operation of the vehicle propulsion system 430, the braking system 432, the steering system 434, the safety system 436, and the cabin system 438. Control stack 422 can receive sensor signals from the sensor systems 404-408 as well as communicate with other stacks or components of the local computing device 410 or a remote system (e.g., the data center 450) to effectuate operation of AV 402. For example, control stack 422 can implement the final path or actions from the multiple paths or actions provided by planning stack 418. This can involve turning the routes and decisions from planning stack 418 into commands for the actuators that control the AV's steering, throttle, brake, and drive unit.

Communications stack 420 can transmit and receive signals between the various stacks and other components of AV 402 and between AV 402, data center 450, client computing device 470, and other remote systems. Communications stack 420 can enable the local computing device 410 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 420 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

HD geospatial database 426 can store HD maps and related data of the streets upon which the AV 402 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

AV operational database 424 can store raw AV data generated by the sensor systems 404-408, stacks 412-422, and other components of AV 402 and/or data received by AV 402 from remote systems (e.g., data center 450, client computing device 470, etc.). In some embodiments, the raw AV data can include HD LIDAR point cloud data, image data, RADAR data, GPS data, and other sensor data that data center 450 can use for creating or updating AV geospatial data or for creating simulations of situations encountered by AV 402 for future testing or training of various machine learning algorithms that are incorporated in local computing device 410.

Data center 450 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. Data center 450 can include one or more computing devices remote to local computing device 410 for managing a fleet of AVs and AV-related services. For example, in addition to managing AV 402, data center 450 may also support a ridesharing service, a delivery service, a remote/roadside assistance service, street services (e.g., street mapping, street patrol, street cleaning, street metering, parking reservation, etc.), and the like.

Data center 450 can send and receive various signals to and from AV 402 and client computing device 470. These signals can include sensor data captured by the sensor systems 404-408, roadside assistance requests, software updates, ridesharing pick-up and drop-off instructions, and so forth. In this example, data center 450 includes a data management platform 452, an Artificial Intelligence/Machine Learning (AI/ML) platform 454, a simulation platform 456, a remote assistance platform 458, and a ridesharing platform 460, and a map management platform 462, among other systems.

Data management platform 452 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 450 can access data stored by the data management platform 452 to provide their respective services.

AI/ML platform 454 can provide the infrastructure for training and evaluating machine learning algorithms for operating AV 402, the simulation platform 456, the remote assistance platform 458, the ridesharing platform 460, the map management platform 462, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

Simulation platform 456 can enable testing and validation of the algorithms, machine learning models, neural networks, and other development efforts for AV 402, remote assistance platform 458, ridesharing platform 460, map management platform 462, and other platforms and systems. The simulation platform 456 can replicate a variety of driving environments and/or reproduce real-world scenarios from data captured by AV 402, including rendering geospatial information and road infrastructure (e.g., streets, lanes, crosswalks, traffic lights, stop signs, etc.) obtained from a cartography platform (e.g., map management platform 462); modeling the behavior of other vehicles, bicycles, pedestrians, and other dynamic elements; simulating inclement weather conditions, different traffic scenarios; and so on.

Remote assistance platform 458 can generate and transmit instructions regarding the operation of the AV 402. For example, in response to an output of the AI/ML platform 454 or other system of data center 450, remote assistance platform 458 can prepare instructions for one or more stacks or other components of AV 402.

Ridesharing platform 460 can interact with a customer of a ridesharing service via a ridesharing application 472 executing on client computing device 470. The client computing device 470 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing ridesharing application 472. Client computing device 470 can be a customer's mobile computing device or a computing device integrated with the AV 402 (e.g., the local computing device 410). The ridesharing platform 460 can receive requests to pick up or drop off from the ridesharing application 472 and dispatch the AV 402 for the trip.

Map management platform 462 can provide a set of tools for the manipulation and management of geographic and spatial (geospatial) and related attribute data. The data management platform 452 can receive LIDAR point cloud data, image data (e.g., still image, video, etc.), RADAR data, GPS data, and other sensor data (e.g., raw data) from one or more AVs 402, Unmanned Aerial Vehicles (UAVs), satellites, third-party mapping services, and other sources of geospatially referenced data. The raw data can be processed, and map management platform 462 can render base representations (e.g., tiles (2D), bounding volumes (3D), etc.) of the AV geospatial data to enable users to view, query, label, edit, and otherwise interact with the data. Map management platform 462 can manage workflows and tasks for operating on the AV geospatial data. Map management platform 462 can control access to the AV geospatial data, including granting or limiting access to the AV geospatial data based on user-based, role-based, group-based, task-based, and other attribute-based access control mechanisms. Map management platform 462 can provide version control for the AV geospatial data, such as to track specific changes that (human or machine) map editors have made to the data and to revert changes when necessary. Map management platform 462 can administer release management of the AV geospatial data, including distributing suitable iterations of the data to different users, computing devices, AVs, and other consumers of HD maps. Map management platform 462 can provide analytics regarding the AV geospatial data and related data, such as to generate insights relating to the throughput and quality of mapping tasks.

In some embodiments, the map viewing services of map management platform 462 can be modularized and deployed as part of one or more of the platforms and systems of data center 450. For example, the AI/ML platform 454 may incorporate the map viewing services for visualizing the effectiveness of various object detection or object classification models, simulation platform 456 may incorporate the map viewing services for recreating and visualizing certain driving scenarios, remote assistance platform 458 may incorporate the map viewing services for replaying traffic incidents to facilitate and coordinate aid, ridesharing platform 460 may incorporate the map viewing services into client application 472 to enable passengers to view AV 402 in transit en route to a pick-up or drop-off location, and so on.

Figure 5:
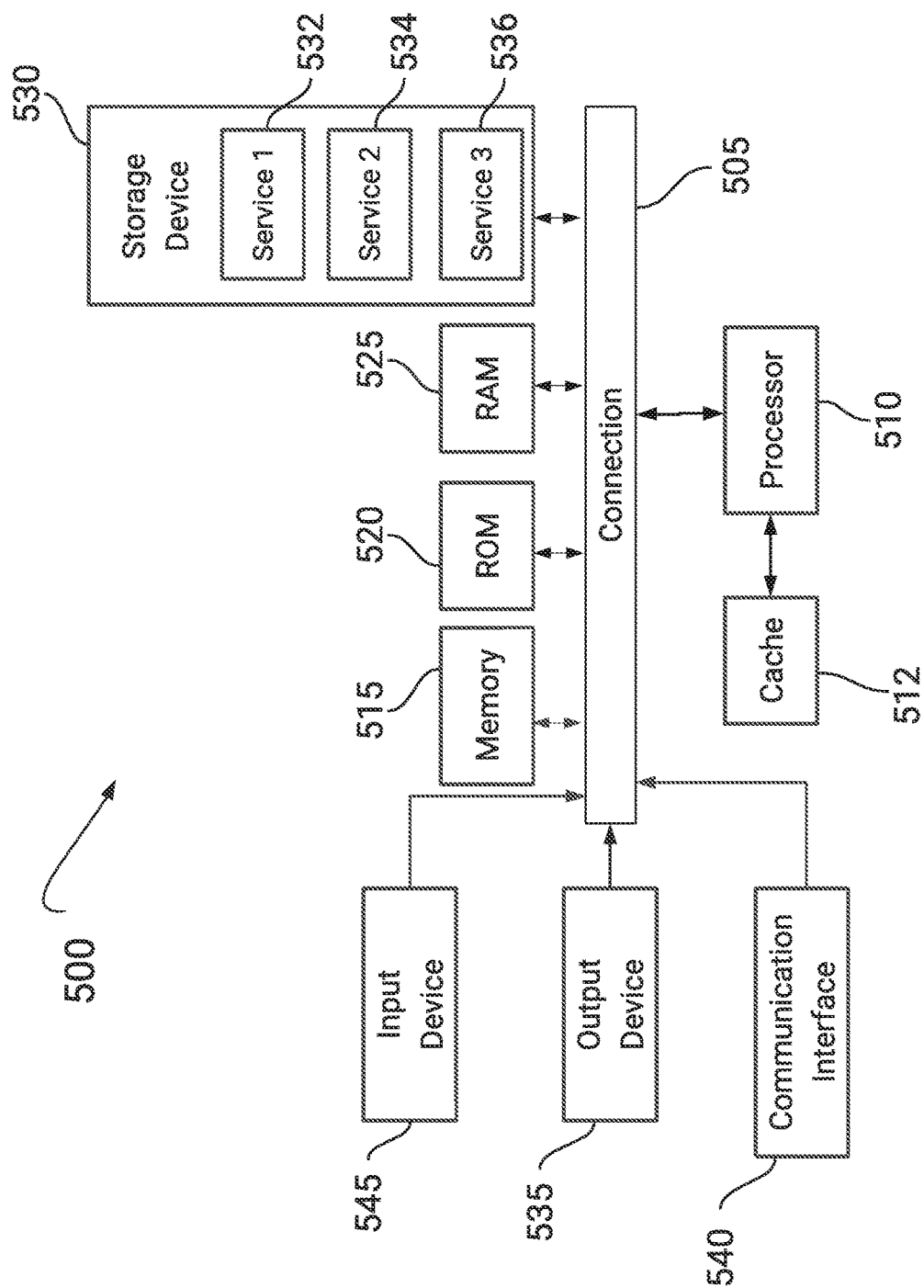
FIG. 5 illustrates an example processor-based system with which some aspects of the subject technology can be implemented.

FIG. 5 illustrates an example apparatus (e.g., a processor-based system) with which some aspects of the subject technology can be implemented. For example, processor-based system 500 can be any computing device making up internal computing system 410, remote computing system 450, a passenger device executing the rideshare app 470, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

Computing system 500 can be (or may include) a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a Blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L6), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. An apparatus comprising:
    at least one memory; and
    at least one processor coupled to the at least one memory, the at least one processor configured to:
        generate a first synthetic scene for testing an autonomous vehicle (AV), wherein the first synthetic scene represents a three-dimensional (3D) environment that is based on a predetermined operating goal in relation to the AV;
        provide the first synthetic scene to a first machine-learning model to generate a first text description of the first synthetic scene;
        provide the first text description to a second machine-learning model to determine if the first text description aligns with the predetermined operating goal;
        generate a second text description for the first synthetic scene, if the first text description does not align with the predetermined operating goal; and
        provide the second text description to a third machine-learning model to generate a second synthetic scene, wherein the second synthetic scene corresponds to the predetermined operating goal for the AV.

2. The apparatus of claim 1, wherein the at least one processor is further configured to:
    determine a safety score for the second synthetic scene.

3. The apparatus of claim 2, wherein the at least one processor is further configured to:
    update an operating parameter of the AV based on the safety score.

4. The apparatus of claim 2, wherein the safety score for the second synthetic scene is based on a safety score for the first synthetic scene.

5. The apparatus of claim 1, wherein the predetermined operating goal specifies a set of regulatory requirements.

6. The apparatus of claim 1, wherein the predetermined operating goal specifies a driving event.

7. The apparatus of claim 1, wherein the predetermined operating goal specifies a safety violation.

8. The apparatus of claim 1, wherein the first machine-learning model comprises a Generative Adversarial Network (GAN).

9. The apparatus of claim 1, wherein the first synthetic scene is generated from a real driving scenario by matching characteristics of one or more objects in the first synthetic scene to one or more corresponding objects in the real driving scenario.

10. The apparatus of claim 1, wherein the first and second synthetic scenes exhibit variations with respect to time.

11. The apparatus of claim 1, wherein to generate the second text description the at least one processor is further configured to:
    preserve one or more features of the first synthetic scene, while achieving the predetermined operating goal.

12. A computer-implemented method, comprising:
    generating a first synthetic scene for testing an autonomous vehicle (AV), wherein the first synthetic scene represents a three-dimensional (3D) environment that is based on a predetermined operating goal in relation to the AV;
    providing the first synthetic scene to a first machine-learning model to generate a first text description of the first synthetic scene;
    providing the first text description to a second machine-learning model to determine if the first text description aligns with the predetermined operating goal;
    generating a second text description for the first synthetic scene, if the first text description does not align with the predetermined operating goal for the AV; and
    providing the second text description to a third machine-learning model to generate a second synthetic scene, wherein the second synthetic scene corresponds to the predetermined operating goal for the AV.

13. The computer-implemented method of claim 12, further comprising:
    determining a safety score for the second synthetic scene.

14. The computer-implemented method of claim 13, further comprising:
    updating an operating parameter of the AV based on the safety score.

15. The computer-implemented method of claim 13, wherein the safety score for the second synthetic scene is based on a safety score for the first synthetic scene.

16. The computer-implemented method of claim 12, wherein the predetermined operating goal specifies a set of regulatory requirements.

17. The computer-implemented method of claim 12, wherein the predetermined operating goal specifies a driving event.

18. The computer-implemented method of claim 12, wherein the predetermined operating goal specifies a safety violation.

19. The computer-implemented method of claim 12, wherein the first machine-learning model comprises a Generative Adversarial Network (GAN).

20. A non-transitory computer-readable media comprising instructions stored thereon which, when executed are configured to cause a computer or processor to:
   generate a first synthetic scene for testing an autonomous vehicle (AV), wherein the first synthetic scene represents a three-dimensional (3D) environment that is based on a predetermined operating goal in relation to the AV;
   provide the first synthetic scene to a first machine-learning model to generate a first text description of the first synthetic scene;
   provide the first text description to a second machine-learning model to determine if the first text description aligns with the predetermined operating goal;
   generate a second text description for the first synthetic scene, if the first text description does not align with the predetermined operating goal for the AV; and
   provide the second text description to a third machine-learning model to generate a second synthetic scene, wherein the second synthetic scene corresponds to the predetermined operating goal for the AV.

\* \* \* \* \*